(12) United States Patent
Harrington et al.

(10) Patent No.: US 11,468,284 B2
(45) Date of Patent: Oct. 11, 2022

(54) SPACE UTILIZATION MEASUREMENT AND MODELING USING ARTIFICIAL INTELLIGENCE

(71) Applicant: HERMAN MILLER, INC., Zeeland, MI (US)

(72) Inventors: Patrick Harrington, Boulder, CO (US); Alex K. Cammenga, Hudsonville, MI (US)

(73) Assignee: MillerKnoll, Inc., Zeeland, MI (US)

( * ) Notice: Subject to any disclaimer, the term of this patent is extended or adjusted under 35 U.S.C. 154(b) by 1021 days.

(21) Appl. No.: 16/172,211

(22) Filed: Oct. 26, 2018

(65) Prior Publication Data

US 2020/0134418 A1   Apr. 30, 2020

(51) Int. Cl.
| | |
|---|---|
| *G06N 20/20* | (2019.01) |
| *G06N 7/00* | (2006.01) |
| *G06K 9/62* | (2022.01) |
| *G06N 3/04* | (2006.01) |
| *G06N 3/08* | (2006.01) |
| *G06F 16/909* | (2019.01) |
| *H04W 4/021* | (2018.01) |

(Continued)

(52) U.S. Cl.
CPC ......... *G06N 3/0427* (2013.01); *G06F 16/909* (2019.01); *G06K 9/6256* (2013.01); *G06N 3/08* (2013.01); *H04W 4/021* (2013.01); *H04W 4/025* (2013.01); *H04W 4/33* (2018.02)

(58) Field of Classification Search
CPC ........ G06N 3/0427; G06N 3/08; G06N 7/005; G06N 20/20; G06N 3/0454; G06F 16/909; G06K 9/6256; G06K 9/6292; G06K 9/6267; H04W 4/021; H04W 4/025; H04W 4/33; G06V 10/82; G06V 2201/10
See application file for complete search history.

(56) References Cited

U.S. PATENT DOCUMENTS

| | | | |
|---|---|---|---|
| 8,577,711 B2 | 11/2013 | Korecki et al. | |
| 2009/0193217 A1* | 7/2009 | Korecki | G06Q 10/087 711/170 |
| 2013/0023247 A1 | 1/2013 | Bolon et al. | |

(Continued)

OTHER PUBLICATIONS

International Search Report with Written Opinion for related Application No. PCT/US19/56300 dated Jan. 2, 2020 (15 Pages).

*Primary Examiner* — Joseph E Dean, Jr.
(74) *Attorney, Agent, or Firm* — Michael Best & Friedrich LLP (57) ABSTRACT

Methods and systems for training a multivariate model predicting utilization of a space. One method includes receiving, over a period of time, signals from each of a plurality of mobile devices located in the space and generating, based on the signals received from each of the plurality of mobile devices, a plurality of location data points for each of the plurality of mobile devices, each of the plurality of location data points for a mobile device including a timestamp and a position within the space of the mobile device. The method also includes accessing metadata of the space, and using, with an electronic processor, the plurality location data points for each of the plurality of mobile devices and the metadata of the space to train machine learning engine. In addition, the method includes predicting a utilization of the space using the machine learning engine.

20 Claims, 8 Drawing Sheets

(51) Int. Cl.
*H04W 4/33* (2018.01)
*H04W 4/02* (2018.01)

(56) References Cited

U.S. PATENT DOCUMENTS

| | | | |
|---|---|---|---|
| 2014/0195530 A1* | 7/2014 | Milton | G06F 16/29 |
| | | | 707/734 |
| 2014/0274022 A1 | 9/2014 | Bell et al. | |
| 2015/0095333 A1 | 4/2015 | Porpora et al. | |
| 2022/0136841 A1* | 5/2022 | Bennati | H04L 63/0421 |
| | | | 701/411 |
| 2022/0136860 A1* | 5/2022 | Dong | G08G 5/025 |
| | | | 701/16 |

* cited by examiner

SPACE UTILIZATION MEASUREMENT AND MODELING USING ARTIFICIAL INTELLIGENCE

FIELD

Embodiments described herein relate to measuring and modeling utilization of a space using artificial intelligence techniques and, in particular, creating a multi-variate model for predicting utilization of a space using sensor data tracking movement within the space.

SUMMARY

Companies, universities, governments, and other institutions routinely seek to understand how individuals utilize a space that has been set aside for professional, academic, commerce-related, recreational activities, or the like. Existing techniques for measuring or modeling such utilization, however, fail to model or measure utilization at a granular level based on various variables, such as day of the week, time of day, design esthetics (lighting, office configuration, or the like), occupation, team or department association, user duties, or the like. Accordingly, embodiments described herein provide systems and methods for granularly measuring (for example, anonymously) the whereabouts of individuals as a function of time and modeling probability distribution functions of where individuals tend to be within a space when account for a variety of variables. In some embodiments, this modeling is achieved by leveraging techniques in artificial intelligence (AI), such as a Mixture of Experts Neural Network (MENN) vector target response (latitude/longitude/altitude) regression representation. For example, a MENN can be trained to provide space utilization predictions based on one or more specified variables. For example, the MENN may be used to predict the effect of a coffee bar or other collaboration or meeting space on utilization of a space on all individuals or even a particular category of individuals, such as members of the engineering department or a specific project team.

In particular, one embodiment provides a method of training a multivariate model predicting utilization of a space. The method includes receiving, over a period of time, signals from each of a plurality of mobile devices located in the space and generating, based on the signals received from each of the plurality of mobile devices, a plurality of location data points for each of the plurality of mobile devices, each of the plurality of location data points for a mobile device including a timestamp and a position within the space of the mobile device. The method also includes accessing metadata of the space and using, with an electronic processor, the plurality location data points for each of the plurality of mobile devices and the metadata of the space to train machine learning engine. In addition, the method includes predicting a utilization of the space using the machine learning engine.

Another embodiment provides a system for training a multivariate model predicting utilization of a space. The system includes at least one electronic processor. The at least one electronic processor is configured to receive, over a period of time, signals from each of a plurality of mobile devices located in the space and generate, based on the signals received from each of the plurality of mobile devices, a plurality of location data points for each of the plurality of mobile devices, each of the plurality of location data points for a mobile device including a timestamp and a position within the space of the mobile device. The at least one electronic processor is also configured to determine, based on the plurality of location data points for at least one of the plurality of mobile devices, an amount of time the at least one of the plurality of mobile devices is positioned within an area within the space associated with a user category, and, in response to the amount of time exceeding a threshold, assigning the at least one of the plurality of mobile devices to the user category. In addition, the at least one electronic processor is configured to access metadata of the space, use the plurality location data points for each of the plurality of mobile devices and the metadata of the space to train machine learning engine, and predict a utilization of the space using the machine learning engine.

Yet another embodiment provides non-transitory, computer-readable medium including instructions that, when executed by at least one electronic processor, perform a set of functions. The set of functions includes receiving, over a period of time, signals from each of a plurality of mobile devices located in the space and generating, based on the signals received from each of the plurality of mobile devices, a plurality of location data points for each of the plurality of mobile devices, each of the plurality of location data points for a mobile device including a timestamp and a position within the space of the mobile device. The set of functions also includes accessing metadata of the space, using the plurality location data points for each of the plurality of mobile devices and the metadata of the space to train machine learning engine, and predicting a utilization of the space using the machine learning engine. In some embodiments, the machine learning engine includes a mixture of experts neural network representation of a conditional probability density function.

Other aspects of the invention will become apparent by consideration of the detailed description and accompanying drawings.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, embodiments described herein provide a deep, granular and unique understanding of space utilization that allows a user, such as an interior designer, to understand how a space can be optimized for a desired outcome. For example, using artificial intelligence (AI) based modeling allows a space to be algorithmically perturbed (for example, change design esthetics or space configuration) to observe how behavior (usage) changes before or after the proposed change. These predictions lead to an optimization paradigm wherein the space and attributes of the space can be optimally changed to induce desired expected behavior, such as increased frequency of collisions between particular departments or increased utilization of a previously underutilized conference room. As described in more detail below, sensors, such as an array of topologically diversified sensors, passive track "chatter" transmitted by user devices (for example, smart phones, smart wearables, tablet computers, or the like) over one or more wireless networks, such as WiFi, Bluetooth, or cellular networks. This detected "chatter" allows the systems and methods described herein to capture a device identifier and a geographic position of the device within the space (for example, a latitude value, a longitude value, and, optionally, an altitude value) from user devices included in a space, which define a "state" of the devices and the space as a function of a sampling time. The data collected by the sensors can be anonymous, which allows for anonymous spatial-temporal device tracking of how individuals are interacting with the space. The anonymous collected information, however, can be processed as described herein to determine additional metadata regarding the user device, sometimes referred to as "adjacent signals" herein, such as a category, including a team identifier, department identifiers, or the like. For example, by comparing anonymous collected location data with defined areas of the space assigned to a particular category, the systems and methods described herein can detect when a particular user (associated with a tracked user device) spends a predetermined threshold of his or her time in a categorical area of the space and automatically categorize the tracked user device as being associated with the category. In particular, when a particular user (associated with a tracked user device) spends 50% or more of his or her time within the space within an area of the space assigned to the engineering department, the user (and the location data tracked for that user) can be associated with an engineering category. Depending on how granular the space can be categorized, in some embodiments, a user device can be assigned to a particular user, which may allow additional user metadata to be obtained and used to generate the multivariate model. For example, employee data may be pulled from a human resources data source, such as a database of resumes or employee demographic data.

Furthermore, metadata regarding the space can be defined, such as day of the week, time of day, teams or occupations, categorical representations, design and lighting esthetics, attributes or configurations of the space, such as the placement and size of desks, conference rooms, collision areas, or the like. All of this metadata can be used to bring in "adjacent signals" that augment a space utilization representation as a multivariate generative process. The resulting multivariate vector representation can then be used to statistically model and explain how space tends to be used and interacted with, including modeling "collisions" in space-time, such as impromptu or spontaneous meetings or gatherings.

Figure 1:
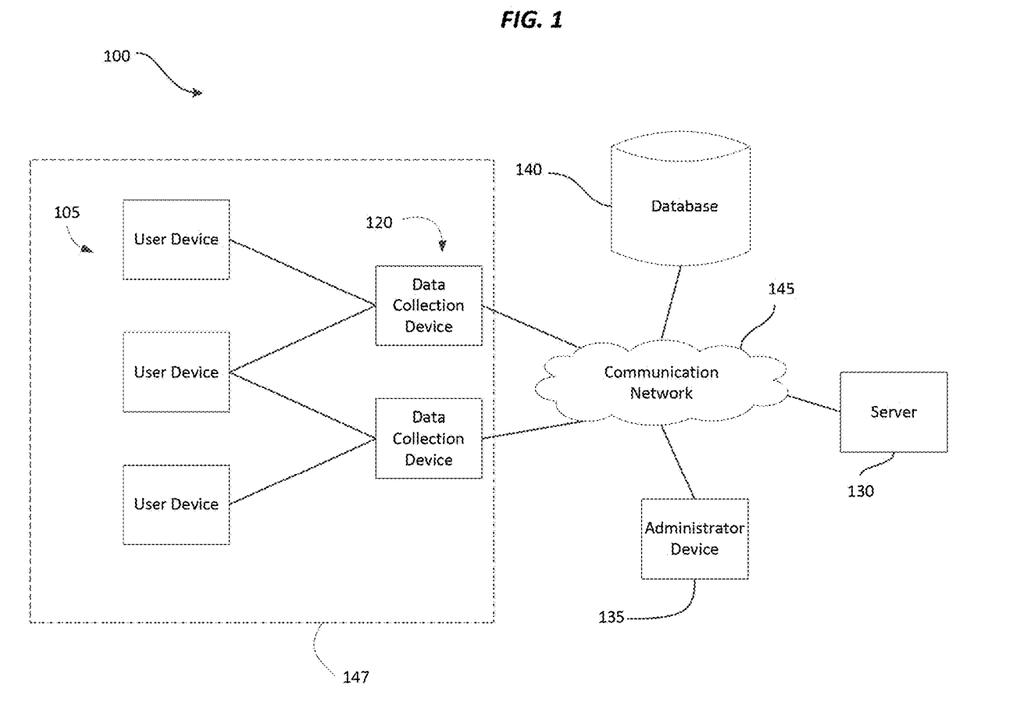
FIG. 1 schematically illustrates a system for predicting utilization of a space based on a plurality of features according to one embodiment.

For example, FIG. 1 illustrates a system 100 for measuring and modeling space utilization based on a plurality of features or variables. The system 100 includes a plurality of user devices (referred to as a group and individually using the reference number "105"), a plurality of data collection devices (referred to as a group and individually using the reference number "120"), a server 130, an administrator device 135, and a database 140. The server 130, the data collection devices 120, the administrator device 135, and the database 140 communicate over one or more wired or wireless communication networks 145. Portions of the wireless communication networks 145 may be implemented using a wide area network, such as the Internet, a local area network, such as a Bluetooth™ network or Wi-Fi, and combinations or derivatives thereof.

The user devices 105 and the administrator device 135 are electronic computing devices, such as a smart phone, a smart watch, a tablet computer, a laptop computer, a mixed reality headset, or the like. Furthermore, in some embodiments, the user devices 105 are mobile devices that are capable of being carried or moved by users as the users move within a defined space 147. As illustrated in FIG. 1, in some embodiments, the data collection devices 120 are also located within the defined space 147. However, in other embodiments, one or more of the data collection devices 120 are located external to the space 147. It should also be understood that the specific number of user devices 105 and data collection devices 120 illustrated in FIG. 1 are purely for illustrative purposes, and the systems and methods described herein may use other numbers of user devices 105, data collection devices 120, or a combination thereof. Similarly, it should also be understood that the system 100 may include any number of servers, administrator devices, and databases and the single server 130, single administrator device 135, and single database 140 illustrated in FIG. 1 are purely for illustrative purposes. Also, in some embodiments, one of the data collection devices 120 may communicate with the server 130 through one or more intermediary devices (not shown).

In some embodiments, the data collection devices 120 include an array of sensors (topologically diversified sensors) positioned in the space 147 to receive signals from user devices 105 located within the space 147. It should be understood that a particular user device 105 may communicate with one or more of the data collection devices 120. As noted above, the data collection devices 120 may be configured to track "chatter" generated by the user devices 105 as the user devices 105 communicate over one or more communication networks, such as a WiFi, Bluetooth, or cellular network. The data collection devices 120 may be configured to passively track this chatter by listening for signals transmitted by the user devices 105 for communication purposes separate from tracking the location of the user devices 105. However, in other embodiments, the data collection devices 120 may be configured to actively ping or query the user devices 105 for signals or information that can be used by the systems and methods described herein to track a user device's location within the space. It should also be understood that, in some embodiments, the signals received from the user devices 105 by the data collection devices 120 may include location information for the user devices 105. However, in other embodiments, the signals received from the user devices 105 may be used (by the data collection devices 120 or the server 130) to determine location information for a user device 105, such as using triangulation or other device locating techniques.

The data collection devices 120 may be configured to periodically receive data from the user devices 105. For example, the user devices 105 may transmit signals at a predetermined frequency, such as every fifteen or forty-five seconds, and the data collection devices 120 can detect these transmitted signals and store the data for subsequent transmission to the server 130. Accordingly, in some embodiments, each data collection device 120 includes a transceiver for detecting signals from the user devices 105 and transmitting data to the server 130 and non-transitory, computer-readable medium for storing the detected signals (even temporarily as a buffer or cache). In some embodiments, each data collection device 120 also includes an electronic processor for processing detected data before transmitting the data to the server 130. For example, it should be understood that the generation of location information for use with the systems and methods described herein may be performed by a data collection device 120, the server 130, or a combination thereof. Also, in some embodiments, one or more of the data collection devices 120 may be configured to store received or processed data in one or more intermediary devices, such as one or more remote storage devices, including, for example, the database 140. In some embodiments, the data collected by the data collection devices 120 is transmitted to the server 130 periodically, such as nightly. However, in other embodiments, the collected data may be transmitted as a real-time or near real-time data stream.

In some embodiments, the raw data collected by the data collection devices 120 includes a device identifier ("device_id") (which may be persistent or may change), a latitude value, a longitude value, an altitude value, and a timestamp, such as epoch time integer timestamp, as collected over a period of time (a day, a week, a month, or the like). Accordingly, the data collection devices 120 collect data for accurately estimating where a user device 105 is positioned within the space 147 at a particular point in time with a sampling frequency, such as every fifteen to every forty-five seconds.

Figure 2:
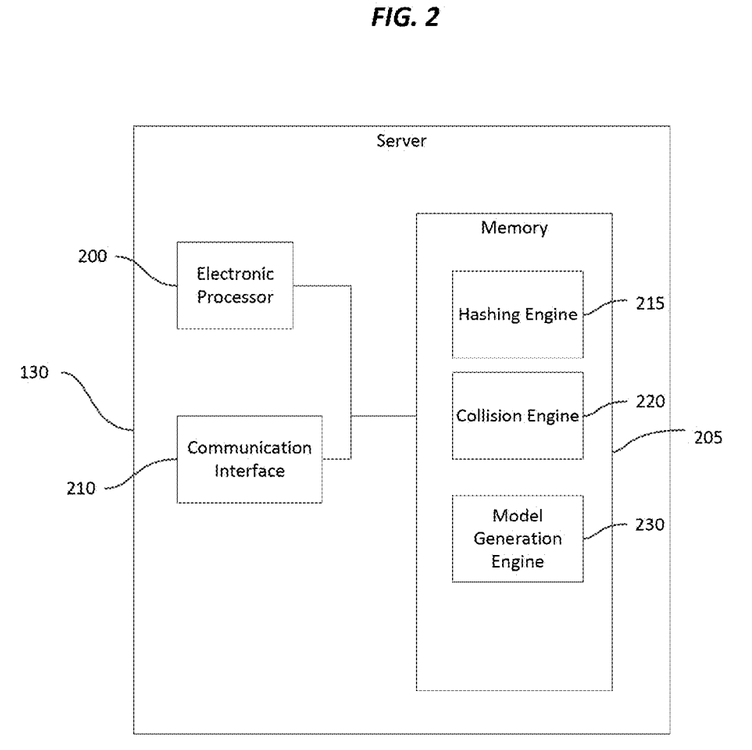
FIG. 2 schematically illustrates a server of the system of FIG. 1 according to one embodiment.

As illustrated in FIG. 2, the server 130 is an electronic computing device that includes an electronic processor 200 (for example, a microprocessor, application-specific integrated circuit (ASIC), or another suitable electronic device), a memory 205 (a non-transitory, computer-readable storage medium), and a communication interface 210, such as a network interface or transceiver, for communicating over the communication network 145 and, optionally, one or more additional communication networks or connections. The electronic processor 200, the memory 205, and the communication interface 210 communicate, for example, wirelessly, over one or more communication lines or buses, or a combination thereof. It should be understood that the server 130 may include additional components than those illustrated in FIG. 2 in various configurations and may perform additional functionality than the functionality described in the present application. Furthermore, in some embodiments, the server 105 may be included within a cloud computing environment including a plurality of servers 105. It should also be understood that although the server 130 is illustrated in FIG. 1 outside or remote from the space 147, in some embodiments, the server 130 is positioned within the space 147.

The electronic processor 200 is configured to execute instructions stored in the memory 205 to perform a set of functions, including the functionality described herein to provide a cloud platform for space utilization measuring and modeling. For example, as illustrated in FIG. 2, the memory 205 stores a hashing engine 215, a collision engine 220, and model generation engine 230. It should be understood that the software illustrated in FIG. 2 may perform functionality in addition to the functionality described herein. In addition, the functionality described herein may be distributed or combined in various configurations of one or more software modules. The configuration of software modules illustrated in FIG. 2 is purely for illustrative purposes. As also noted above, in some embodiments, the functionality described herein (or portions thereof) described herein as being performed by the server 130 may be performed by one or more of the data collection devices 120.

Figure 3A:
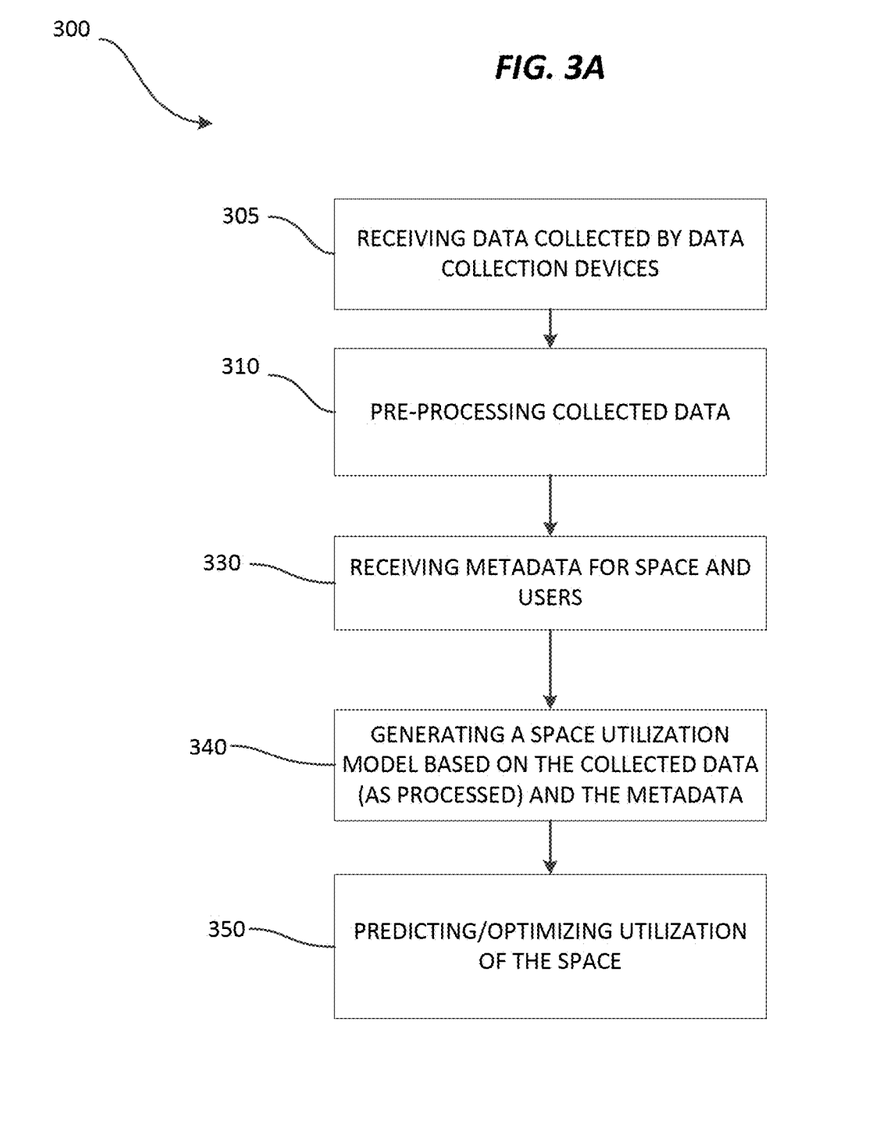
FIG. 3A is a flowchart illustrating a method of modeling and measuring space utilization performed by the system of FIG. 1 according to one embodiment

FIG. 3A is a flow chart illustrating a method 300 of measuring and modeling space utilization performed by the system 100 and, in particular, performed by the server 130 through execution of instructions by the electronic processor 200. As noted above, in some embodiments, the functionality described herein with respect to FIG. 3A can be performed by devices other than the server 130, including distributing the described function over a plurality of devices, such as a cloud environment or distribution between the data collection devices 120 and the server 130.

As illustrated in FIG. 3A, the method 300 includes receiving data, as collected by the data collection devices 120, regarding the user devices 105 and where the user devices 105 are positioned or located within the space 147 at particular points in time (at block 305). In some embodiments, the collected data represents location data points for the user devices 105 over a predetermined period of time, such as a week or a month. In particular, the data collected by the data collection devices 120 can include a plurality of location data points, wherein each location data point includes a device identifier, a position within the space 147 (a latitude value, a longitude value, and, optionally, an altitude value), and a timestamp. As noted above, in some embodiments, the data collected by the data collection devices 120 is downloaded to the server 130 (or a data storage location accessible by the server 130) in real-time or near real-time or at predetermined intervals, such as nightly. Thus, the server 130 may be configured to access this collected data as stored locally on the server 130, as received over a data stream, or as stored in a separate data storage location, including, for example, the database 140.

Figure 3B:
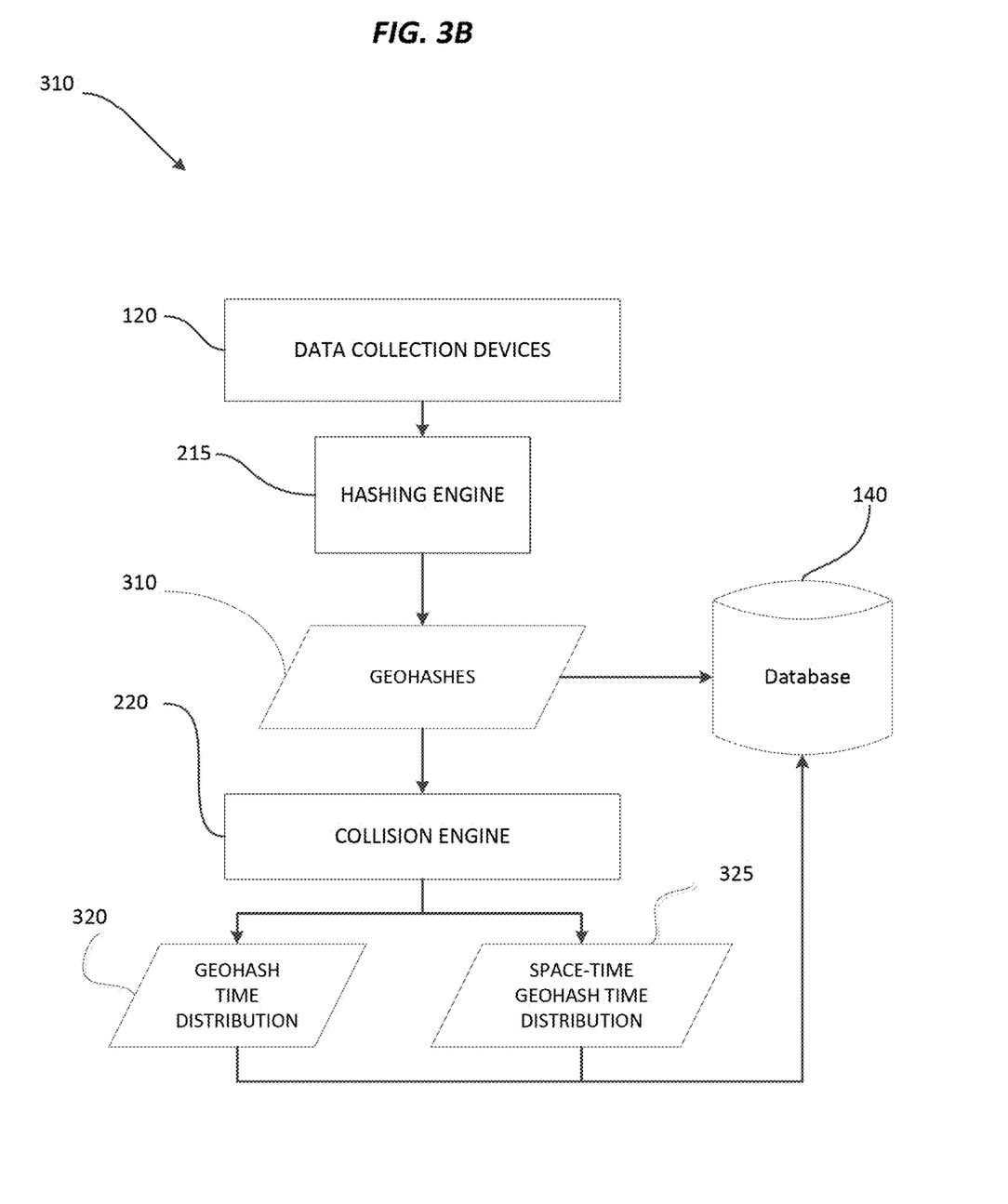
FIG. 3B is a data flow diagram illustrating conversion of raw location data to processed data performed by the system of FIG. 1 as one part of the method of FIG. 3A according to one embodiment.

In some embodiments, the data provided by data collection devices 120 is "raw" in a sense that the data has yet to be processed for effective modeling. Thus, in this situation, the method 300 may also include converting the collected location data points (at block 305). FIG. 3B illustrates data flow within the server 130 to initially process and convert the raw collected location data points according to one embodiment. As illustrated in FIG. 3B, the data collected via the spatial-temporal data collection devices 120 is processed by the hashing engine 215 to generate one or more geohashes (at block 310). A geohash collapses multiple (for example, two) dimensions to a single rowkey where similar data points (locations defined by latitude and longitude) within a space produce similar geohashes. For example, given a latitude of 42.756256456027 and a longitude of −86.12561896163, the resulting geohash may be a 12 digit alpha-numeric array "dpdg0pt1pxgu." The characters in the geohash represent a region of space and the region of space represented by the characters becomes more specific as the characters are read from left to right. For example, the first two characters may represent a metro area and further characters may define the metro area more granularly as reading the characters from left to right. The prefix of a geohash (a predefined leading subset of characters included in the geohash, such as, for example, the first eight, nine, or ten characters) defines a predefined region or area of space, such as a three meter by three meter region or tile or a four meter by four meter region or tile, which may be granular enough for dense spaces, such as office spaces. For example, the geohash prefix of the following geohash "dpdg0pt1pxgu" is "dpdg0pt1p." Other geohashes including this same prefix may be considered representing locations within the same region or tile of the space 147. A geohash prefix can also be "inverted" back to the centroid of the latitude and longitude corresponding to the geohash.

Thus, after generating a geohash from the position included in a location data point, each location data point includes a device identifier, a geohash, a time, and optionally an altitude. In some embodiments, the hashing engine 215 also creates other geohashes, such as by combining a generated geohash with a time and, optionally, an altitude, to create discretized versions. For example, the hashing engine 215 may also be configured to convert a geohash into a space-time hash. A space-time hash includes a geohash prefix followed by a special character (for example, the character '|') and a time hash, which includes a time (epoch time) divided by an integer to represent a defined time intervals. For example, dividing the time by 30 (representing 30 seconds) generates space-time geohashes representing 30 second intervals. Likewise, in some embodiments, a geohash that includes altitude includes a geohash prefix followed by a special character (for example, the character '|') and an altitude value or hash. When altitude is included in the geohash with latitude and longitude, the geohash indicates where a user device 105 is in space (x, y, z), such as what floor or level of a building the user device 105 is located on. As described below, space-time geohashes can be used to track when multiple user devices 105 are in the same region within the space 147 at the same time (same time interval). In particular, this format of the space-time geohash forms the basis for building adjacent data structures that can be used to determine a device identifier specific probability distribution of how a user associated with the identified user device 105 spends his or her time across geohash prefixes. For example, by extending the geohash prefix hash to include thirty second time intervals, the data structures can be used to capture "collisions" between two or more device identifiers (associated with two or more user devices 105) in the same region or tile of the space 147 at the same time. These detected collisions can be used to track duration and other metadata of meetings or gatherings of users or user teams or departments As illustrated in FIG. 3B, the generated geohashes can be stored in a persistent storage, such as, for example, the database 140. In some embodiments, the database 140 includes a database management system, which controls access to stored data, such as through a programming language, including, for example, Structured Query Language (SQL). For example, in some embodiments, the database 140 is a MySQL database, which is an open-source relationship database management system. As described below, the database 140 can be queried to access space utilization measurements for the space 147.

As also illustrated in FIG. 3B, the generated geohashes can also be provided to the collision engine 220. The collision engine 220 may implement a map-reduced topology of workers (for example, a plurality of threads or central processing unit (CPU) cores) that process the generated geohashes (for example, in a streaming fashion). For example, a first worker may sort the generated geohashes by device identifier, geohash prefix, and time (epoch time) in ascending order. The sorted data provided by the first worker is provided to a second worker, which computes the "difference" of how much time was spent in each geohash (prefix) as a time per region or tile. This pre-processed data can be stored in the database 140 with additional pre-processing information, such as how much time (measured, for example, in seconds) a user device 105 spent in each geohash included in the space (represented as a probability distribution over finite geohashes (geohash prefixes) (at 320)). This user device 105 specific distribution of time spent per geohash is useful in understanding how users spend their time and where they spend their time (for example, the distribution shows whether a user spends a majority of their time at their desk, spends the majority of their time in specific conference rooms, or the like).

The collision engine 220 can similarly process the space-time geohashes (at 325). As noted above, the space-time geohashes can be used to determine the duration of time spent in detected collisions and this information can be stored in the database 140 for subsequent more granular or deeper processing of collision statistics, such as, for example, participants in a meeting, average duration of meetings, nearest internal landmarks to meetings (for example, coffee bar, meeting room, or the like). All of the preprocessing of the collected data converts the "raw" data into a more useable format for computing statistics against which to average over spurious events. For example, the data structures stored in the database 140 enable statistics and spatial/temporal compression for subsequent deeper insights.

Figure 4:
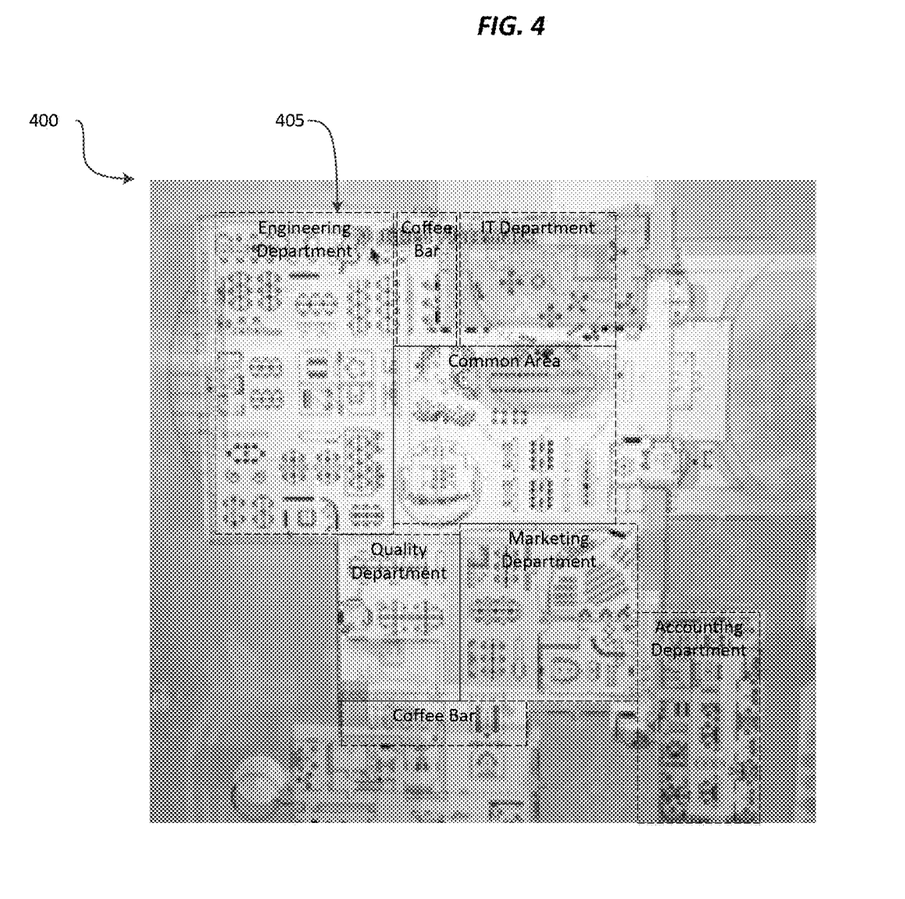
FIG. 4 is an illustration of a floor plan including a plurality of landmarks according to one embodiment.
Figure 5:
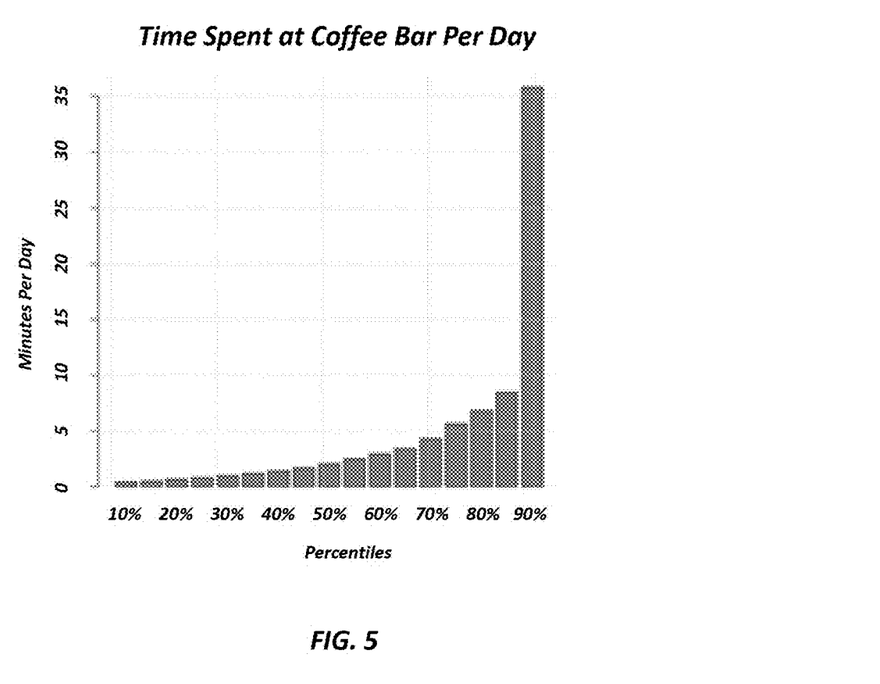
FIG. 5 illustrates a time distribution determined by the system of FIG. 1 according to one embodiment.

Returning to FIG. 3A, to further expand the scope and depth of insights available regarding utilization of the space 147, the server 130 also receives, such as through the administrator device 135, metadata for the space 147 and, optionally, metadata for the users (at block 330). The metadata may include location (latitude and longitude) boundaries, centroids, or both of landmarks within the space 147, which may also be coupled with additional metadata describing the landmark (a type or category of landmark that describes the landmark's function or esthetics). For example, landmarks in the space 147 may include, for example, equipment within the space, such as a coffee bar, a defined area, such as a meeting room or a stair well, or the like. To provide this metadata, a user, such as an administrator or interior designer for the space 147, may use the administrator device 135 to access or define a floor plan for the space 147 and mark and define landmark on the floor plan. As one example, a user may mark a location of a conference room within the floor plan, such as by defining boundaries of the landmark, and indicate that the landmark is a conference room with a capacity of 10 people and a whiteboard. In some embodiments, based on the location of the landmark marked on the floor plan by the user, the administrator device 135 may be configured to automatically determine latitudinal and longitudinal borders of the landmark, a centroid of the landmark, or both. FIG. 4 illustrates an example of a landmark marked on a floor plan 400. In FIG. 4, the location of the landmark is marked by the location of the pin icon 405 on the floor plan 400. The metadata regarding the space 147 can also be stored in persistent storage, such as the database 140. In some embodiments, geohashes can also be generated for the landmarks as described above for the location data collected from the user devices 105. As described in more detail below, the geohashes generated regarding the landmarks within the space 147 can be used to perform space utilization and collision activity with respect to the nearest landmark. For example, by extracting conditional relationships based on the types of landmarks versus raw space (geohashes), various statistics can be calculated. As one example, the data can be used to process collisions occurring at (around) a coffee bar, an entrance to the space 147, or the like. The latitude, longitude, and subsequent geohash prefixing of landmarks within the space 147 provide the natural join to geohash and latitude/longitude-based nearest neighbor inheritance. For example, FIG. 5 illustrates a distribution of time space at a coffee bar included in the space 147.

These analytics are calculated from the space-time hashes and counting a total duration of time spent across all user devices 105 that pass through the geohashed region that encapsulates the coffee bar. These analytics can be further nuanced by conditioning the "counters" for a particular day of the week, a particular time of day, or other effects to decompose these types of distributions further.

As the data collected from the user devices 105 may be anonymous (not include any identifying information regarding a user associated with a particular user device 105), it may be difficult to perform analytics based on user characteristics (user metadata). For example, the distribution illustrated in FIG. 5 is for all user devices 105 and not just those user devices 105 associated with users included in a particular team or department. To collect the metadata needed to analyze the collected data at more of a user-level, the data collection devices 120 can be configured to collect user metadata from the user devices 105. Collecting this data, however, may give rise to privacy concerns as user device 105 would be required to transmit identifying information regarding the user of the device 105. Accordingly, in some embodiments, the data collected from the user devices 105 remains anonymous but the server 130 is configured to determine user metadata based on the activity of user devices 105 within the space 147 and defined metadata for the space 147. For example, in some embodiments, the server 130 is configured to determine a category (for example, a profession or department) of a user device 105 (or the user associated with the user device 105) based on what regions of the space 147 the user device 105 is frequently or regularly located. In particular, the metadata for the space 147 may define regions within the space 147 where various categories of users including teams, departments, or individuals are located or assigned. For example, the metadata may define that engineering is located in northeast corner of the space 147 and engineer "John Doe's" desk or office is located at a particular location within this corner. Accordingly, the probability distribution function over granular geohash tiles enables the server 130 to map each device identifier to a team or desk that the device 105 spends the most time at, which enables an inheritance operation of the device 105 spends a "sufficient" (or threshold based) time at that particular location (geohash). For example, when a user device 105 spends at least a predetermined percentage (for example, forty percent) of time within the space 147 within a particular region of the space 147, the server 130 categorizes the user device according to the category or metadata of the region. In particular, as one example, when a particular user device 105 spends sixty percent of the time that the user device 105 is within the space 147 in a location that is associated with a specific user "John Smith," the server 130 associates the user device 105 (identified by a device identifier) with "John Smith" and, optionally, any other metadata regarding the "John Smith," such as Mr. Smith's team or department, role, current project or job assignment or the like. In some embodiments, when a specific identity of a user is associated with a particular user device 105, the server 130 can be configured to access one or more data sources, such as human resources data source, a billing data source, or the like, to obtain metadata regarding the identified user. As another example, when a particular user device 105 spends seventy percent of the time that the user device 105 is within the space 147 in an area that is associated with an engineering department, the server 130 associates the user device with the engineering department.

In some embodiments, a derivation of the binary classification technique of precision and recall (referred to herein as "team inversion") can be used as the classification technique using, for example, a predetermined threshold, such as forty percent, to determine whether a particular user device 105 can be mapped to a particular area or landmark (desk or office) within the space 147. For example, in some embodiments, the following team inversion classification algorithms (1-tau Precision) can be used to categorize user devices 105. Variable T is the geohashes of categories (for example, teams or desks) under possible inversion. These algorithms allow a probability distribution to be computed with respect to duration of time spent in a particular geohash bucket. Any determined categorizations (team or individual level association) or other metadata for a particular user device can be stored in persistent storage, such as the database 140, for subsequent lookup to bring in team or occupation level information for downstream processing.

$$S_i(\tau) = \{ghash_j : \widehat{\mathbb{P}}(ghash_j | device_i) \geq 1-\tau\} \quad \quad 1.$$

$$\arg\max_{ghash \in \{S_i(\tau) \cap \tau\}} \widehat{\mathbb{P}}(ghash_j | device_i) \quad \quad 2.$$

As described above, raw position data (latitude and longitude values) of user devices 105 as a function of a granular sampling rate can be used to perform various space utilization analytics. Furthermore, by geohashing the space 147 (through landmark and other space metadata definition), the server 130 can be configured to understand adjacent data, such as team association or proximity, to attributes of the space 147, which help decorate the space 147 and the associated collected data with further metadata.

One goal of space utilization modeling is to understand statistical tendencies of where users spend their time and, in some embodiments, where users spend their time "conditioned" on various signals, such as hour of the day, day of the week, team, or the like. Thus far, the server 130's functionality has been focused on two types of space utilization: individual representation of how user devices 105 explore the space 147 and "collisions" (when at least two or more user devices and, thus, two or more users, interact at the same point in space and time).

In some embodiments, the server 130 (using various machine learning techniques) also uses mathematical approximation techniques to quantify a probability of "space utilization," which can be conditioned on one or more variables. For example, the following equations characterize an algorithm that quantifies Bayesian Counters on the cumulative duration of time spent per geohash (prefix), including geohashes of varying sizes (for example, two meter by two meter, four meter by four meter, or the like).

1. $f(x \in S_q, z \in Z) = \sum_{\{i: x_i \in S_q \cap Z_x\}} \sum_{\{k: T(k) \cap Z_t\}} (t_{i,k+1} - t_{i,k})$ 2. where $Z = Z_x \cup Z_t$ 3. $\hat{P}(x \in S_q \mid z \in Z) = \dfrac{f(x \in S_q, z \in Z)}{\sum_{q'} f(x \in S_{q'}, z \in Z)}$ The Bayesian Counters quantify space utilization as a cumulative duration of time spent in geohashes conditioned on attributes Z, which can include an hour of the day, a day of the week, a team association, or the like. In other words, the conditional probabilities (equation 3 above) characterize the output of the Bayesian Counters that quantify space utilization conditioned on a few variables. Equation 1 directly above is fed in from persistent storage (database 104), such as the outputs of FIG. 3B. In some embodiments, equation 1 directly above is fed as a stream. However, when long term behavior estimates are being computed, behavior over weeks or months can be averaged for steady estimates of space utilization. In some embodiments, the mathematical Bayesian Counter framework also amends itself for understanding conditional "collisions." In some embodiments, the duration of time is computed as differences against absolute time (integer epoch time) (see equation 1 above). Output from the Bayesian Counters can be stored to persistent storage, such as the database 140. In addition, in some embodiments, the output from the Bayesian Counters can be fed to an optimization engine as described below.

Figure 6:
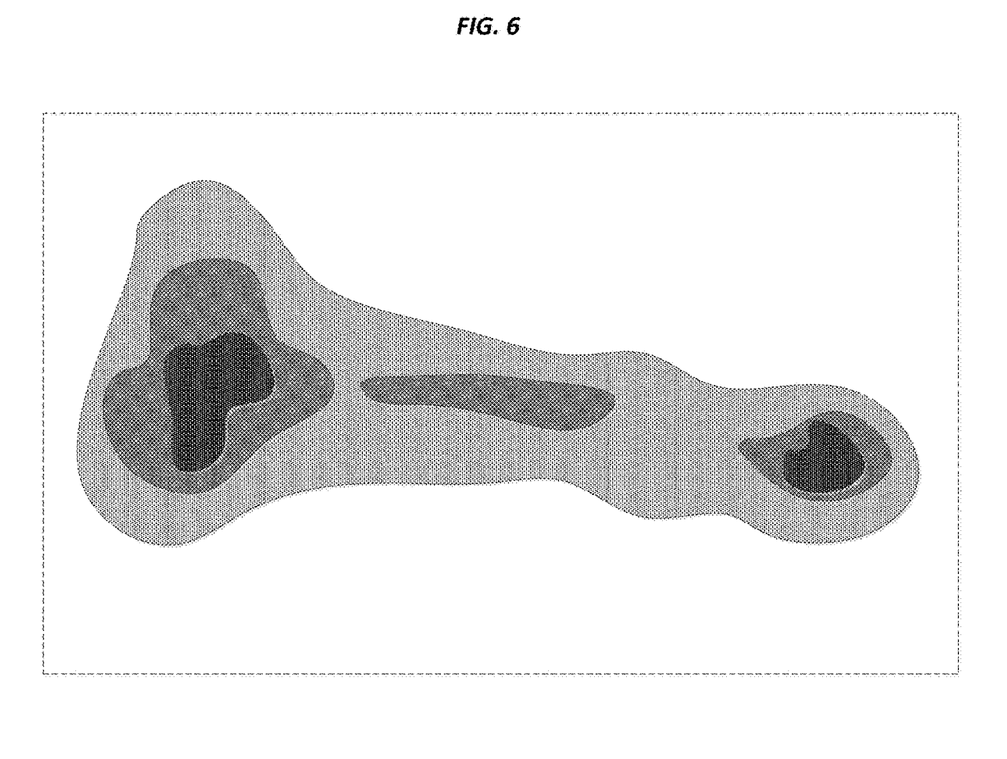
FIG. 6 is a heat map illustrating utilization of a space according to one embodiment.

In some embodiments, output from the Bayesian Counters can be visualized as heat maps overlaid on a floor plan or other visualization of the space 147. For example, FIG. 6 illustrates a sample heat map that represents behavior at 3:00 pm on Tuesdays for a marketing team or department.

The Bayesian Counters provide an estimate of space utilization propensities to provide a "coarse" ability to explore conditional behavior on a few signals. However, the Bayesian Counter may limit the understanding of broader and deeper effects conditioning on more and more variables, since such conditioning removes a number of data points, which may leave insufficient data points for generalizing or modeling behavior.

Accordingly, some embodiments described herein recast the problem as a multivariate, generative probability distribution function that can account for a multitude of effects while providing "what if" scenario planning on potential perturbations (changes) to the space and the subsequent change in how space is mathematically utilized.

For example, the server 130 may be configured (through the model generation engine 230) to perform sophisticated techniques in AI for mathematically modeling and representing local dynamics while holistically globally modeling system wide dynamics. For example, different regions of a space may exhibit generally different behavior or, when accounting for time or day, day of week and team behavior, a space or regions thereof may exhibit different modes of collision and space utilization. Accordingly, the server 130 (through the model generation engine 230, also referred to herein as a machine learning engine) may learn and generatively model these topically specific modes of dynamics using one or more AI (machine learning) techniques, such as, for example, a Mixture of Experts Neural Network (MENN).

For example, a MENN can be used to model the probability of space utilization at a pointy={latitude, longitude} against a p-dimensional input vector z, which results in a probability distribution P(y|z). This "generative" distribution allows the server 130 to encode available information about the space 147 (for example, design esthetic, lighting styles, attributes of furniture in space, geohash, and the like) as well as time-based attributes (time of day, day of week, or like), user-based attributes, or a combination thereof. Accordingly, the server 130 can use various techniques in machine learning to learn applicable mathematical relationships using, for example, a MENN framework.

For example, the following equation represents a high level mathematical representation of a MENN representation of a conditional probability density function:

$$p(y|z) = \Sigma_{j=1}^{m} f_{\theta_j}(y|z, c_j) g_{\psi_j}(c_j|z)$$

Because space utilization is the collective aggregation of users using or occupying a space 147, the multivariate Gaussian can be invoked to locally describe such behavior. The multivariate Gaussian is a distribution for modeling physical processes given that the most Hamiltonian of such processes are quadratic of polynomial of slightly higher order. The ensemble weighting in the above equation enables a more flexible representation than a singular, global multivariate normal function.

The below equation represents a $j^{th}$ topic multivariate normal distribution representation of space (latitude and longitude) utilization about an input signal z. In particular, the equation represents a mean function and covariance learned through weighted least squares nested within an expectation maximization (EM) algorithm.

$$f_{\theta_j}(y \mid z, c_j) = \dfrac{1}{\sqrt{(2\pi)^k |\Sigma_j|}} e^{-\frac{1}{2}(y - \mu_j(z))^T \Sigma_j^{-1}(y - \mu_j(z))}, k = 2$$

In particular, the mean function mu_j(z) is a functional representation of the centroid of space utilization for an expert or topic j. The mean function model mu_j(z) can be modeled as an functional representation, such as an affine linear transformation, a deep learning neural network, or the like. Embodiments described herein will be provided as an affine linear transformation where the neural network expert gating network learns non-linear topics of mode of physical space utilization. Once this is learned, a linear representation of the effects can be used (for example, polynomial, non-linear interactions in the affine expansion can be represented as "linear"). For example, as the Hamiltonian is well approximated by polynomial expansions, leveraging such an affine expansion is further justified.

In particular, the following equation represents a mean function for the $j^{th}$ topic. This mean function has an intercept term "alpha_j" that can be absorbed into the matrix and vector multiplication notation (with a tilde) can denote the extension of the vector space to dimension+1. For purposes of simplicity, the notation tilde and phi may be dropped herein.

$$\mu_j(z)=\alpha_j+\Theta_j\phi(z)=\tilde{\Theta}_j\phi(\tilde{z}),\ \mu_j(z)\in\mathbb{R}^2$$

The "neural network" in this MENN framework can be introduced through the probability distribution over latent topics (to be learned) according to the following equation, which represents a $j^{th}$ "expert" single layer neural network.

$$g\psi_j(c_j|z) = \frac{e^{\psi_j^T z}}{\sum_{j=1}^{m} e^{\psi_j^T z}}$$

In some embodiments, this probability distribution over topics can be constrained to single layer neural networks. For example, a topology of the deeper neural networks in the above Equation could be encoded by replacing z with a deep neural net expansion. This deeper topology may identify more nuanced and nonlinear interactions in how the signal space partitions and ultimately, how well space utilization is fit (for example, the coupling occurs through the EM algorithm that jointly fits f and g for all m experts).

Furthermore, in some embodiments, the server 130 fits the generative model in the above equation the EM algorithm. For example, a target utility function aimed at maximizing against n observed data points (being drawn in from the persistent storage (the database 104)) can include the following log-likelihood function, which presents a log likelihood function for mixture of expert space utilization representation:

$$\mathcal{L}_n(\Phi, \Psi)=\Sigma_{i=1}^n \log(\Sigma_{j=1}^m f_{\Phi_j}(y_i|z_i, c_j)g_{\Psi_j}(c_j|z_i))$$

By invoking the concepts of the EM algorithm, the server 130 can arrive at an update algorithm EMMENFit for this unique problem:

---

Algorithm 1 EMMENNFit: EM Fit Mixture of Experts Neural Networks

1: function EM( $(z_i, y_i)_{i=1}^n$, m)
2: $(\Theta_j, \psi_j, \Sigma_j)_{j=1}^m \leftarrow$ N(0, I), N (0, I), I  ▷ Init: Normally Distributed identity
3: U,D,$V^T \leftarrow$ ssvd(Z)  ▷ sparse, singular value decomposition
4: A,B $\leftarrow$ VD$^{-1}V^T$, UU$^T$  ▷ sub-structures used for efficient online updates (avoids matrix inversions in EM algorithm
5: $Z^\dagger \leftarrow$ UD$^{-1}V^T$  ▷ pseudo matrix inverse used in efficient inverse hessian updates
6: k $\leftarrow$ 0
7: $\gamma \leftarrow$ 0.01
8: while True do;
   // Update Posterior Weights //
9: $w_{i,j}(\Phi, \Psi) \leftarrow (f_{\Theta_j}(y_i|z_i,c_j)g_{\psi_j}(c_j|z_i))/(\Sigma_j f_{\Theta_j}(y_i|z_i, c_j)g_{\psi_j}(c_j|z_i))$  ▷ ∀ i,j
   // Efficient Update Equations for Generalized Multivariate Normal Distributions //
10: $P_{-j,k}^{-1}, P_{j,k} \leftarrow \text{diag}\left(\frac{1}{1-w_{i,j}}\right)\text{diag}(w_{i,j})$  ▷ only data structures that get updated, diagonal, efficient
11: $\hat{\Theta}_{j,k+1}^T \leftarrow A \cdot P_{-j,k}^{-1} \cdot B \cdot P_{j,k} \cdot Y$  ▷ ∀ j
12: $\hat{\Sigma}_{j,k+1} \leftarrow \sum_{i=1}^n w_{i,j} y_i - \hat{\Theta}_{j,k+1} \cdot z_i (y_i - \hat{\Theta}_{j,k+1} \cdot z_i)^T / \sum_{i=1}^n w_{i,j}$  ▷ ∀ j
   // Efficient Update Equations Newton-Raphson Gradient Descent for Probability Distribution Over Latent Topics (Expert Gates) //
13: // $(\psi_j^{(l+1)} \leftarrow \psi_j^{(l)} - \gamma H_{(l)}^{-1} g_{(l)})$ //
14: l $\leftarrow$ 0
15: $\psi_j^{(l)} \leftarrow \psi_{j,k}$
   ∀ j ∈ (1, ..., m); do
16: while True do;
17: $\delta W_{j,k}^{-1,(l)} \leftarrow \text{diag}(1/(1 - w_{i,j} \cdot g_{\psi_j}^{(l)}(1 - g_{\psi_j}^{(l)})))$  ▷ Efficient Update to Inverse Hessian
18: $g_{w_{j,k}}^{(l)} \leftarrow \sum_{i=1}^n w_{i,j}(1 - g_{\psi_j^{(l)}}) \cdot z_i$  ▷ gradient
19: $H_{j,(l)}^{-1} \leftarrow -(Z^\dagger) \delta W_{j,k}^{-1,(l)} Z^\dagger$  ▷ efficient update to inverse hessian
20: $\psi_j^{(l+1)} \leftarrow \psi_j^{(l)} - \gamma H_{j,(l)}^{-1} \cdot g_{w_{j,k}}^{(l)}$
   if ($\|\psi_j^{(l+1)} - \psi_j^{(l)}\|_2 \leq \epsilon$; BREAK) ;else PASS
21: l $\leftarrow$ l+1
22 end while
23: $\psi_{j,k} \leftarrow \psi_j^{(l+1)}$  ▷ update ∀ j
24: // Check Convergence Across Model Parameters // // If Model Parameters Are "Not Changing Much" wrt L2 Norm, Break Else Continue //
25; end while
26: return $\{\hat{\Theta}_j, \hat{\Sigma}_j, \hat{\psi}_j\}_{j=1}^m$
27: end function Accordingly, the above algorithm (EMMENFit) can be used for a custom expectation maximization efficient update for MENNs, wherein matrix inversion lemma can be invoked to avoid expensive inner matrix inversions. In particular, one solution to this AI problem can be invoked against the geohashed and formatted data in the persistent storage (the database 140). Metadata about device identifiers, location data (latitude and longitude), geohashes, and the like can be expanded to form a larger signal feature representation to "explain" space utilization or collision behavior at which locations (latitudes, longitudes, and altitudes) such collisions tend to occur.

A tuning parameter selection of the number of mixtures (or latent topics) m can be selected via standard techniques in tuning parameter selection. Furthermore, this multivariate representation of space utilization or collision behavior allows physical processes to be holistically decomposed against controlled features (for example, design esthetic of a space, lack of table in room for meetings, or the like). This multivariate presentation provides a requisite for "what if" planning and subsequently full bore recommendation and optimization to evolve a space to an "optimal space." For example, in some embodiments, as noted above, the server 130 can include an optimization engine that using the MENN framework described above to identify and output space optimizations, such as particular esthetics, space configurations, landmark positioning or configuration, or the like that, based on the trained models, optimize utilization of the space 147.

Figure 7:
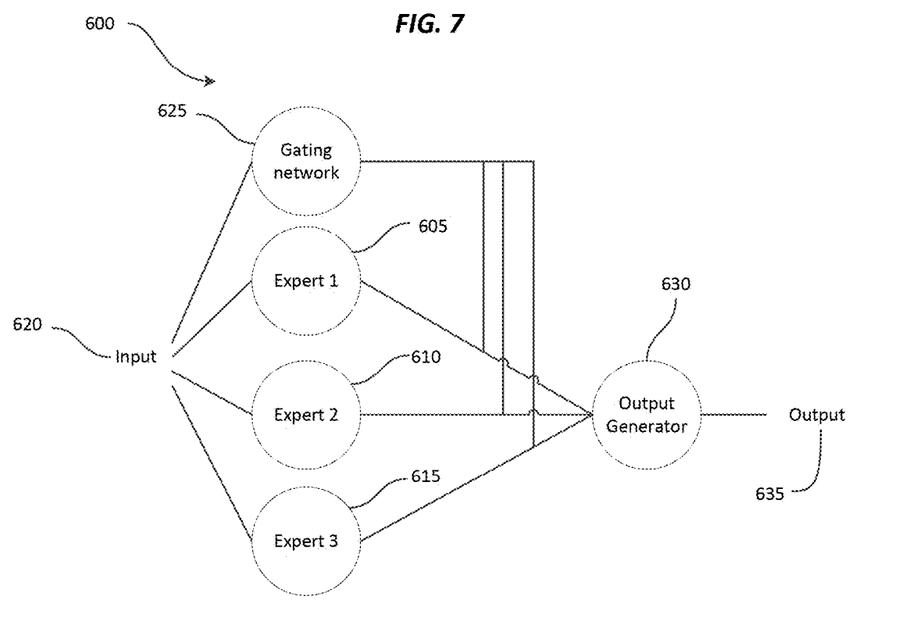
FIG. 7 is a schematic illustration of a mixture of experts neural network according to one embodiment.

For example, as illustrated in FIG. 3A, the server 130 (through execution of the model generation engine 230) can use the information stored in the persistent storage (the database 140), including the collected information (as preprocessed or converted), to generate a utilization model of the space 147 via a MENN framework as described above using (at block 340). For example, the server 130 can use information included in the database 140 to train a MENN 600 as illustrated in FIG. 7. The MENN includes a plurality of experts 605, 610, 615 each of which receive the same input 620. The input is, for example, a region of space and a plurality of variables that may influence the utilization of the region of space. Each expert of the plurality of experts 605, 610, 615 is trained to predict the utilization of the region of the space based on one of the plurality of variables. Lines 9-19 of the above Algorithm 1 relate specifically to training the MENN. For example, the first expert 605 may be trained to predict the utilization of a region of the space given a particular time of day, the second expert 610 may be trained to predict the utilization of a region of the space given a landmark associated with the region, and the third expert 615 may be trained to predict the utilization of a region of the space given a category of users. It should be understood that the MENN 600 may include any number of experts and each expert may include a plurality of nodes organized into a plurality of layers. The MENN 600 also includes a gating network 625 which also receives the same input 620 that each of the experts 605, 610, 615 receives. The gating network 625 generates a weight associated with each of the experts 605, 610, 615 based on the relevance of the expert to the input 620. For each expert included in the MENN 600, the weight the gating network 625 generates for the expert is used to weight the output of the expert. The output generator 630 combines the weighted output to create a prediction (an output 635) of the utilization of the region of the space given the plurality of variables as input.

Once trained, the MENN 600 can be used to provide various outputs that provide measurements, predictions, and optimizations for the space 147 (at block 340). For example, in some embodiments, given a location in the space (latitude, longitude, and altitude), time of day, day of week, type of person, attributes of the metadata with the space 147, or a combination of the foregoing, the MENN 600 can provide outputs similar to the Bayesian Counters described above. For example, the MENN 600 can provide information on the usage of particular regions of the space. Thus, a user (interior designer) may use the MENN 600 to determine how frequently a particular conference room within the space 147 is used as compared to other conference rooms or regions within the space 147. A user may also use the MENN 600 to predict how changing metadata associated with the space 147 (the location of a particular landmark) may impact utilization of the space 147. For example, through the administrator device 135, a user may submit "what if" scenarios (defined in terms of time (date, time of day, type of day, or the like), a user category, a change in space metadata, or the like) defined in terms of one or more variables, and the MENN 600 may output utilization or changes in utilizations according to the specified scenarios. Furthermore, in some embodiments, the server 130 may use the MENN 600 (in connection with an optimization engine executed by the server 130) to automatically suggest changes to the space 147 to improve or optimization utilization. For example, by automatically running through various "what if" scenarios, the optimization engine can automatically identify particular scenarios that may represent improved utilization of the space 147 as compared to a current utilization. Thus, these optimizations may be output to a user for consideration and optimization. It should be understood that the output provided via the MENN 600 (or the associated optimization engine) may be provided in one or more forms, such as, a visual form (heat map, chart, traffic plans, or the like), a textual form, or a combination thereof.

Using, among other things, the space utilization output by the MENN other statistics for an organization may be determined. For example, a retention rate of employees of an organization, a level of well-being/happiness of employees of an organization, a level of productivity of employees (individually or as a group) of an organization, an average performance rating for employees of an organization, and the like may be determined.

In some embodiments, input data from multiple organizations, multiple locations within the same organization, or both may be used by the electronic processor 200 to create a statistical model to determine the effect of space utilization and design on the retention rate of an organization. In some embodiments a user may specify variables such as organization size, type, and location to ensure that only input data from similar organizations is used to create the statistical model. The input data that is used may include space utilization data, space design data, hiring data, and employment termination data. The input data is used to create, for example, a Cox proportional hazards model (a statistical model). Alternatively, when the input data includes data from a single location of a single organization, a log-normal generalized linear model (a statistical model) may be created. The above described models are used to model the retention rate of the organization for the next six months. In some embodiments, the electronic processor 200 of the server 130 provides suggestions for modifying the design of the space to improve the retention rate of an organization.

In some embodiments, input data from multiple organizations, multiple locations within the same organization, or both may be used by the electronic processor 200 to create a statistical model to determine the effect of space utilization and design on the happiness/wellbeing, productivity, and average performance rating of employees of an organization. In some embodiments, a user may specify variables such as organization size, type, and location to ensure that only input data from similar organizations is used to create the statistical model. The input data that is used may include space utilization data, employee satisfaction survey data, and human resources data (for example, performance reviews, number of sick days, and the like), billing data, and the like. The input data is used to create, for example, a multinomial model of categorical outcomes (a statistical model). The multinomial model of categorical outcomes may be represented by the following equation:

$$p(C_k \mid x) = \frac{e^{\theta_k x}}{1 + \sum_{k'=1}^{K-1} e^{\theta_{k'}' x}}$$

In some embodiments, the electronic processor 200 of the server 130 provides suggestions for modifying the design of the space to improve the happiness/wellbeing, productivity, average performance rating, or a combination of the foregoing of employees of an organization the statistical model is created for.

Thus, the embodiments described herein provide, among other things, a system for measuring and modeling utilization of a space based on a plurality of features using machine learning techniques and data collected from user devices present in the space. Various features and advantages of the embodiments are set forth in the following claims.

What is claimed is:

1. A method of training a multivariate model predicting utilization of a space, the method comprising:
   receiving, over a period of time, signals from each of a plurality of mobile devices located in the space;
   generating, based on the signals received from each of the plurality of mobile devices, a plurality of location data points for each of the plurality of mobile devices, each of the plurality of location data points for a mobile device including a timestamp and a position within the space of the mobile device;
   accessing metadata of the space;
   using, with an electronic processor, the plurality location data points for each of the plurality of mobile devices and the metadata of the space to train machine learning engine; and
   predicting a utilization of the space using the machine learning engine.

2. The method of claim 1, wherein receiving the signals from each of the plurality of mobile devices includes receiving passive signals from each of the plurality of mobile devices.

3. The method of claim 1, wherein each of the plurality of location data points for the mobile device includes an identifier of the mobile device.

4. The method of claim 1, wherein the position within the space included in each of the plurality of location data points includes a latitude value and a longitude value.

5. The method of claim 4, wherein the position within the space included in each of the plurality of location data points includes an altitude value.

6. The method of claim 1, wherein generating the plurality of location data points for each of the plurality of mobile devices includes generating a geohash of the position within the space included in each of the plurality of data points.

7. The method of claim 6, further comprising appending, for each of the plurality of location data points for the mobile device, appending the timestamp to the geohash generated of the position within the space.

8. The method of claim 7, further comprising detecting a collision of a subset of the plurality of mobile devices by comparing the geohashes generated for each of the plurality of mobile devices.

9. The method of claim 8, wherein comparing the geohashes generated for each of the plurality of mobile devices includes comparing a prefix of the geohashes and the timestamp appended to each of the geohases.

10. The method of claim 1, further comprising
    determining, based on the plurality of location data points for at least one of the plurality of mobile devices, an amount of time the at least one of the plurality of mobile devices is positioned within an area within the space associated with a user category; and
    in response to the amount of time exceeding a threshold, assigning the at least one of the plurality of mobile devices to the user category.

11. The method of claim 10, wherein the user category includes at least one selected from a group consisting of a department, a team, and an assigned workspace.

12. The method of claim 1, wherein accessing the metadata of the space includes accessing a position of landmarks included in the space.

13. The method of claim 1, wherein accessing the metadata of the space includes accessing a configuration of the space including defined areas included in the space, a position of landmarks included in the space, a size of the landmarks included in the space, and esthetics of the space.

14. The method of claim 1, wherein the machine learning engine includes a mixture of experts neural network.

15. The method of claim 1, wherein predicting utilization of the space using the machine learning engine includes predicting utilization of the space based on at least one selected from a group consisting of a time, a category of users, and a change to the metadata of the space.

16. The method of claim 1, further comprising outputting the predicted utilization of the space as a heat map overlaid on a floorplan of the space.

17. A system for training a multivariate model predicting utilization of a space, the system comprising:
    at least one electronic processor configured to
      receive, over a period of time, signals from each of a plurality of mobile devices located in the space,
      generate, based on the signals received from each of the plurality of mobile devices, a plurality of location data points for each of the plurality of mobile devices, each of the plurality of location data points for a mobile device including a timestamp and a position within the space of the mobile device,
      determine, based on the plurality of location data points for at least one of the plurality of mobile devices, an amount of time the at least one of the plurality of mobile devices is positioned within an area within the space associated with a user category,
      in response to the amount of time exceeding a threshold, assigning the at least one of the plurality of mobile devices to the user category,
      access metadata of the space,
      use the plurality location data points for each of the plurality of mobile devices and the metadata of the space to train machine learning engine, and predict a utilization of the space using the machine learning engine.

18. The system of claim 17, wherein the user category includes at least one selected from a group consisting of a department, a team, and an assigned workspace.

19. Non-transitory, computer-readable medium including instructions that, when executed by at least one electronic processor, perform a set of functions, the set of functions comprising:
- receiving, over a period of time, signals from each of a plurality of mobile devices located in the space;
- generating, based on the signals received from each of the plurality of mobile devices, a plurality of location data points for each of the plurality of mobile devices, each of the plurality of location data points for a mobile device including a timestamp and a position within the space of the mobile device;
- accessing metadata of the space;
- using the plurality location data points for each of the plurality of mobile devices and the metadata of the space to train machine learning engine; and
- predicting a utilization of the space using the machine learning engine.

20. The non-transitory, computer-readable medium of claim 19, wherein the machine learning engine includes a mixture of experts neural network representation of a conditional probability density function.

* * * * *